(No Model.) 2 Sheets—Sheet 2.
W. HECKERT.
VALVE GEAR FOR GAS ENGINES.
No. 425,132. Patented Apr. 8, 1890.
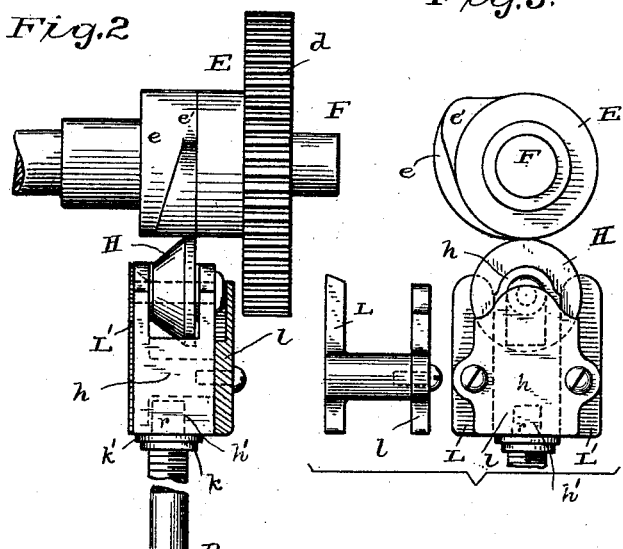
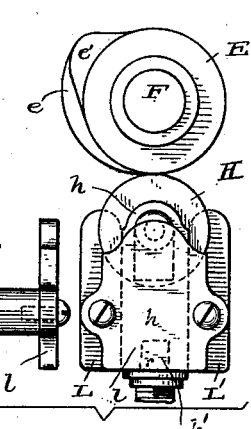
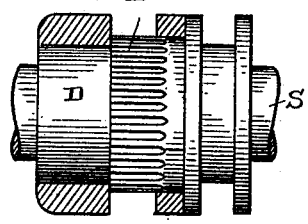
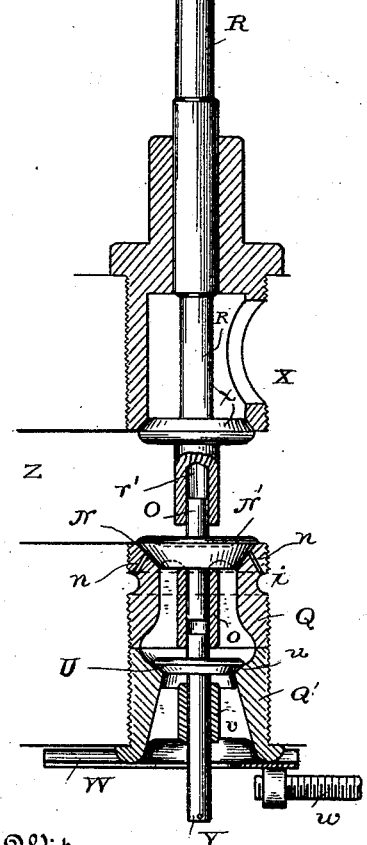
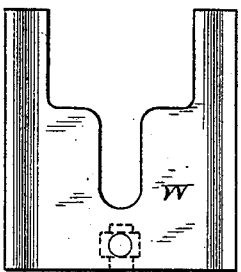
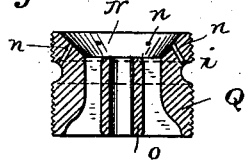
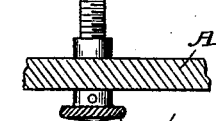
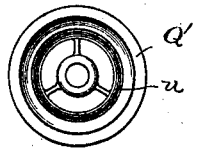
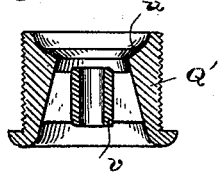
Witnesses
H. G. Lamb
T. H. Brown
Inventor
William Heckert
By his Attorney
A. P. Smith

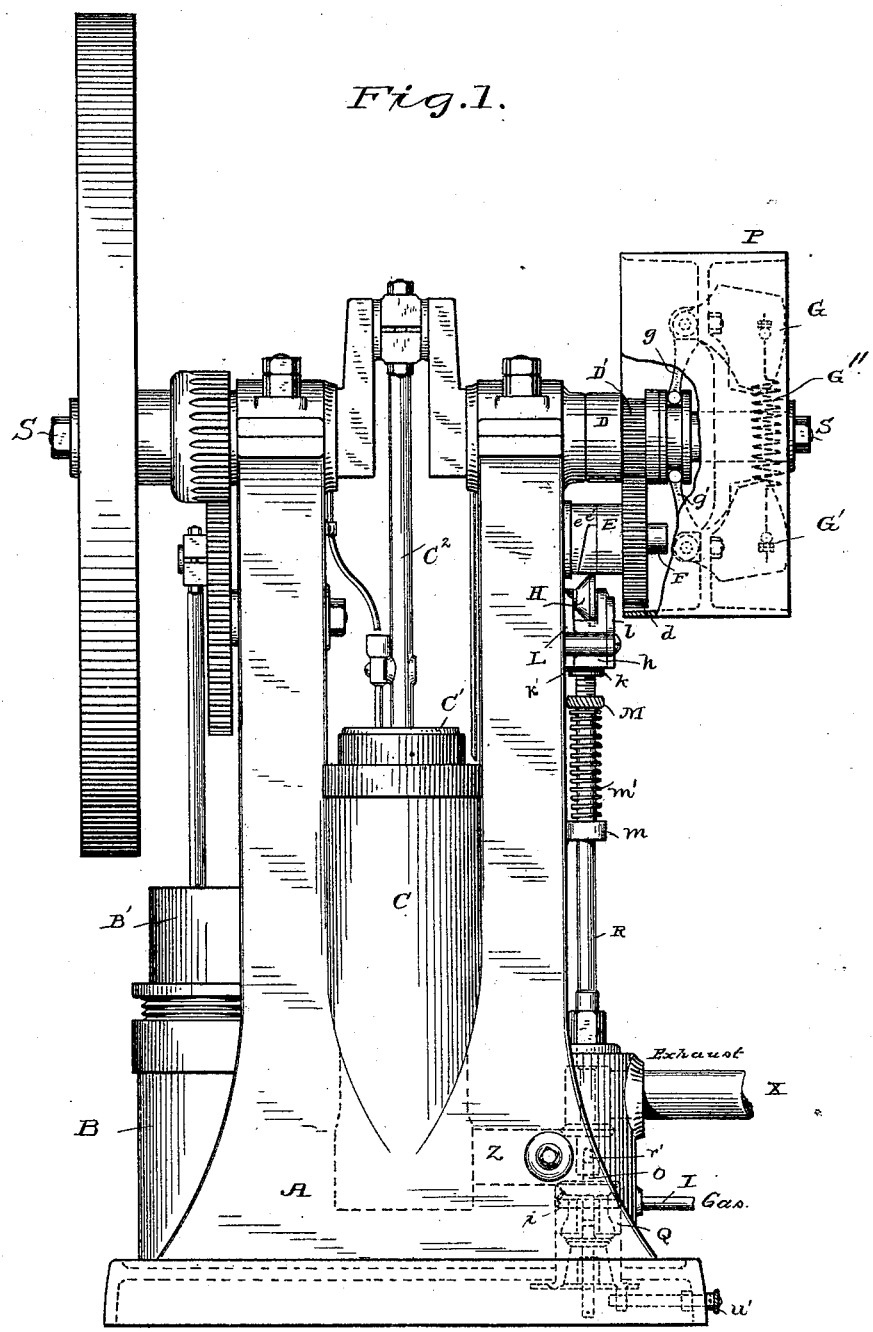

UNITED STATES PATENT OFFICE.

WILLIAM HECKERT, OF YONKERS, NEW YORK.

VALVE-GEAR FOR GAS-ENGINES.

SPECIFICATION forming part of Letters Patent No. 425,132, dated April 8, 1890.

Application filed June 15, 1889. Serial No. 314,458. (No model.)

*To all whom it may concern:*

Be it known that I, WILLIAM HECKERT, a citizen of the United States, residing at Yonkers, in the county of Westchester and State of New York, have invented certain new and useful Improvements in Valve-Gear for Gas-Engines; and I do hereby declare the following to be a full, clear, and exact description of the invention, such as will enable others skilled in the art to which it appertains to make and use the same.

My invention consists in a certain improved arrangement of valves for gas-engines and the mechanism for operating and controlling the same, which will be hereinafter described and claimed.

In the drawings, Figure 1 is a side view of a gas-engine with my invention applied thereto. Fig. 2 is a detailed view of the valves and the cam operating the same, the valves being shown in section. Fig. 3 is a side view of the double cam and the sliding piece operated thereby. Fig. 4 is a detailed view, partly in section, of the adjustable shrouded pinion. Fig. 5 is a plan view of the thimble in which the mixing-valve is seated. Fig. 6 is a longitudinal section of the same. Fig. 7 is a plan view of the thimble in which the check-valve is seated. Fig. 8 is a longitudinal section of the same. Fig. 9 is a plan view of the adjustable gate controlling the opening of the air-inlet passage. Fig. 10 is an end view of the same.

I have illustrated my improved gear as being applied to an upright gas-engine, (shown in Fig. 1,) in which A is the frame and bed-plate, and B is a pump-cylinder cast therewith.

B' is a pump-plunger operated by gearing and connecting-rod from the shaft S, on which there is a fly-wheel and crank, and which is driven by the explosions of gas in the cylinder C, in which the trunk-piston C' works, transmitting motion to the crank through the connecting-rod C'' in the usual way.

The engine-cylinder is charged and exhausted through the common passage Z (indicated in Figs. 1 and 2) in the manner usual in engines of this type. The charge is composed of a mixture of gas and air, the gas entering through the inlet I to the circular groove $i$ cut in the exterior of the thimble Q.

From this it passes through the perforations or secondary ports $n$, connecting the groove $i$ with the face of the valve-seat N, upon which the valve N' rests. The air enters through the opening in the bottom of the engine-bed, which is opened to a greater or less extent by means of the sliding gate W, which is controlled by means of the screw $w$, passing through a threaded lug on the gate W and through the bed-casting A, terminating in a mill-head $w'$.

The check-valve U is seated on the face $u$ in the thimble Q', and is guided in its motion by the stem V, which slides in the guide-sleeve $v$. In the same way the motion of the mixing-valve N' is guided by the valve-stem O, sliding in the sleeve $o$. The sleeves $o$ and $v$ are supported by suitable wings, as shown in Figs. 5 to 8, inclusive.

The exhaust-valve $x$ opens a passage-way from the passage Z to the exhaust-pipe X. This exhaust-valve is mounted on a reciprocating rod R, which has a recess $r'$ cut or bored in its lower end, into which the upper end of the valve-stem O is introduced. This extension of the rod R is just sufficiently long to press upon the top of the combined inlet and mixing valve N' when the exhaust-valve $x$ is opened, thereby insuring the closure of the inlet-valve while the exhaust-valve is open and only permitting the opening of the inlet-valve when the exhaust-valve is closed. The reciprocating rod R is threaded at its upper end and carries the adjustable collars M and $k'$. This rod R passes through the lug $m$ of the engine-frame, and between this lug $m$ and the adjustable collar M a spiral spring $m'$ is compressed. The sliding piece $h$ carries journaled in its upper end a beveled roller H and slides between suitable guide-lugs L L' on the engine-frame and the cap-plate $l$. The lower end of this sliding piece $h$ has a recess $h'$, into which the end $r$ of the rod R is introduced. Between the adjustable collar $k$ and the sliding piece $h$ there is a collar $k'$, of rubber or other elastic material.

On the stud F, set in the engine-frame, is mounted a cam-sleeve E, which has the double cam projections $e$ $e'$. Connected to and revolving with this cam-sleeve E is a gear-wheel $d$, which meshes with the shrouded pinion D', which is cut in the sleeve D, which slides upon and revolves with the main shaft S. The pulley P is keyed to the main shaft S and has mounted on its arms the governor-weights G G', which are normally held together by the spring G''. Projecting arms from these governor-balls, which arms are lettered $g$ and $g'$, mesh with a circumferential groove on the sleeve D, and consequently move this sleeve and shrouded pinion D', and with the latter the gear $d$ and the cam-sleeve E, back and forth as the governor-balls fly out or in under the action of centrifugal force or of the spring G''.

The method of operation of my improved gear is the following: During the exhaust period, which is the downward stroke of the piston after the stroke in which explosion took place, the cam forces the reciprocating rod R down, opens the exhaust-valve $x$, and insures a tight closure of the inlet-valve N'. On the next following upstroke of the piston one of several things takes place, according to the speed at which the engine is running and the consequent position of the governor-balls G and G'. If the engine is running at its normal speed, the governor-balls are in their inmost position of adjustment, and consequently the sleeve D and the cam-sleeve E are pushed to the left, as shown in Fig. 1. The roller H consequently runs over the portion $e'$ of the double cam, and the spring $m'$ forces the reciprocating rod R upward at the close of the exhaust period, closing the exhaust-valve $x$ and removing all pressure from the inlet-valve N'. Consequently on the beginning of the upstroke of the piston a partial vacuum is produced and the atmospheric pressure lifts the check-valve U and the inlet and mixing valve N'. As a result, a stream of air, controlled by the adjustable gate W, rushes up through the valves into the passage Z, and a number of small streams of gas pass from the groove $i$ through the perforations $n$, and, striking the current of air at right angles as it passes through the mixing-valve, the gas is thoroughly intermingled with the air in certain definite and predetermined proportions. The resultant charge of gas and air rushes on into the cylinder, where it is compressed on the downstroke of the piston, then exploded on the next upstroke in the well-known manner. If the engine is running very fast, the governor-balls G G' are at their outermost position of adjustment and the cam-sleeve E is drawn over to its farthest position of adjustment to the right, (referring to Fig. 1.) As a result, the roller H rolls on the portion $e$ of the cam, and is not only kept open during the exhaust period, but during the entire charging period, by which is meant the next upstroke of the piston. In consequence of this the inlet-valve N' is kept tightly closed, and the burned gases, which have been forced out into the exhaust-pipe X, are simply drawn back into the cylinder, and there is no combustible gas admitted. During the next revolution the engine simply compresses this charge of burned gases and gives out no power. At any speed between these two extremes the position of the cam-sleeve E is such that the roller H slips off the portion $e$ of the cam at some intermediate point, and consequently the exhaust-valve is kept open during a greater or less portion of the charging period, and a greater or less portion of the burned gases are drawn back into the cylinder. At the moment the roller H slips off the cam $e$ the exhaust is closed, and during the remainder of the charging period the stream of pure air and gas mingled in the desired proportions is drawn into the cylinder, and a charge of greater or less power is thereby obtained. By turning the adjustable collar M the degree of compression of the spring M' and the consequent upward thrust of the reciprocating rod R against the cam can be controlled. The insertion of the elastic ring or collar $k$ between the sliding piece $h$ and the collar $k'$ on the rod R enables the working parts of the valve-operating mechanism to adjust themselves to any wear of the connections and of the valve in its seat—that is to say, the upward thrust of the spring $m'$, bearing against the elastic collar $k$, insures a tight closure of the exhaust-valve $x$, whereas the downward thrust of the sliding piece $h$, being transmitted through the same collar $k$, insures a complete closure of the inlet-valve N'.

The advantage of placing the check-valve U below the mixing-valve, so that the latter will be between the check-valve and the cylinder, lies in the fact that if the inlet-valve does not close quick enough and the flame gets back of it and produces a slight explosion it will not blow back any farther, owing to the closure of the check-valve, but will simply act through the partly-opened inlet-valve and the passage Z to assist in work done in driving the piston in the cylinder.

By adjusting the gate W the amount of air entering can be controlled, and as the flow of gas is nearly constant the proportions of the mixture in the charge can thereby be regulated within certain limits.

The use of the shrouded pinion D' enables me to put the governor and the gearing for transmitting both the motion and the adjustment compactly together within the driving-pulley P, and dispenses with several of the moving parts usually employed to accomplish the same result.

Having therefore described my invention, what I claim as new, and desire to protect by Letters Patent, is—

1. In a gas-engine, the combination of the inlet-valve and the exhaust-valve placed one over the other and opening in opposite directions, their axes coinciding, the inlet-valve having an upwardly-projecting spindle, and the exhaust-valve having a corresponding downwardly-projecting spindle of larger diameter, which is partly bored out to admit the spindle of the inlet-valve, the longitudinal motion of said spindles one over the other when the valves are in place being exactly equal to the normal opening of the exhaust-valve, whereby the opening of said exhaust-valve to its normal extent insures the complete closure of the inlet-valve, substantially as described.

2. In a gas-engine, the combination of the inlet-valve operated by suction, the reciprocating rod which, when in its lowest position, holds the valve shut, the sliding piece which controls the motion of said rod, and the elastic joint between the sliding piece and the rod, whereby all wear of the parts is taken up, substantially as described.

3. In a gas-engine, the combination of a positively-operated exhaust-valve opening downward, an inlet-valve located beneath the exhaust-valve and opened upward by suction, together with a suitable extension of the exhaust-valve which engages with the inlet-valve and positively closes it when the exhaust-valve is open, the sliding piece and the reciprocating rod, together with the cam which forces the sliding piece downward, and the spring which forces the sliding piece and the reciprocating rod upward, substantially as described.

4. In a gas-engine, the combination of an exhaust-valve, an adjustable double cam which operates the valve, one portion of which cam will hold the valve open while the engine-cylinder is being exhausted, while the other portion will prolong the valve-opening during a part or whole of the time during which the cylinder is being charged, and an automatic governor which controls the adjustment of said double cam, so that one or the other portion is brought into operation, substantially as described.

5. The combination of the adjustable cam capable of endwise motion on the stud upon which it is mounted, the gear-wheel connected to and revolving with said cam, the shrouded pinion with which said gear-wheel meshes and which is also capable of endwise motion, together with the automatic governor which imparts endwise motion to the shrouded pinion, substantially as described.

In testimony whereof I affix my signature in presence of two witnesses.

WILLIAM HECKERT.

Witnesses:
A. P. SMITH,
WASHN. DANENHOWER.